United States Patent
Gong et al.

(10) Patent No.: US 10,146,624 B1
(45) Date of Patent: Dec. 4, 2018

(54) DISK EXTENT REBALANCING IN MAPPED RAID STORAGE ARRAYS

(71) Applicant: EMC IP Holding Company LLC, Hopkinton, MA (US)

(72) Inventors: Shaoqin Gong, Beijing (CN); Lili Chen, Hopkinton, MA (US); Jian Gao, Beijing (CN); Geng Han, Beijing (CN); Xinlei Xu, Beijing (CN); Wayne Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 15/495,240

(22) Filed: Apr. 24, 2017

(51) Int. Cl.
*G06F 11/00* (2006.01)
*G06F 11/10* (2006.01)
*G06F 3/06* (2006.01)
*G06F 11/20* (2006.01)
*G06F 11/14* (2006.01)

(52) U.S. Cl.
CPC .......... *G06F 11/1092* (2013.01); *G06F 3/061* (2013.01); *G06F 3/0604* (2013.01); *G06F 3/0631* (2013.01); *G06F 3/0689* (2013.01); *G06F 11/1076* (2013.01); *G06F 11/142* (2013.01); *G06F 11/2058* (2013.01); *G06F 11/2094* (2013.01); *G06F 2201/805* (2013.01)

(58) Field of Classification Search
CPC ............. G06F 11/1076; G06F 11/2094; G06F 11/1092; G06F 11/0727; G06F 11/2058; G06F 11/142
See application file for complete search history.

(56) References Cited

U.S. PATENT DOCUMENTS

| | | | | |
|---|---|---|---|---|
| 5,574,851 A | * | 11/1996 | Rathunde | G06F 3/0604 711/114 |
| 8,832,528 B2 | * | 9/2014 | Thatcher | G06F 11/073 714/766 |
| 9,641,615 B1 | | 5/2017 | Robins et al. | |
| 9,690,660 B1 | * | 6/2017 | Robins | G06F 11/1088 |
| 2006/0218433 A1 | * | 9/2006 | Williams | G06F 11/1092 714/6.32 |
| 2008/0109601 A1 | * | 5/2008 | Klemm | G06F 3/0608 711/114 |
| 2009/0172468 A1 | * | 7/2009 | Abali | G06F 11/2094 714/6.32 |
| 2010/0017650 A1 | * | 1/2010 | Chin | G06F 11/108 714/6.12 |
| 2011/0167219 A1 | | 7/2011 | Klemm et al. | |

(Continued)

OTHER PUBLICATIONS

IBM Corporation, "Declustered RAID," IBM Knowledge Center. Retrieved from Internet <URL: http://www.ibm.com/support/knowledgecenter/SSFKCN_4.1.0/com.ibm.cluster.gpfs.v4r1.gpfs200.doc/bl1adv_introdeclustered.htm> on Mar. 22, 2017, 3 pages, version 4.1.0.

(Continued)

*Primary Examiner* — Charles Ehne
(74) *Attorney, Agent, or Firm* — BainwoodHuang

(57) ABSTRACT

Techniques detect non-uniform distributions of RAID extents across the storage drives of a data storage appliance and rebalance the allocation of disk extents of the storage drives amongst the RAID extents. The improved techniques prevent the distribution of RAID extents across the storage drives of a mapped RAID system from becoming overly non-uniform.

18 Claims, 6 Drawing Sheets

(56) References Cited

U.S. PATENT DOCUMENTS

| | | | |
|---|---|---|---|
| 2015/0074452 A1* | 3/2015 | Tsukahara | G06F 3/0619 714/6.23 |
| 2015/0242148 A1* | 8/2015 | Suzuki | G06F 3/0619 711/114 |
| 2015/0301896 A1 | 10/2015 | Aliev et al. | |

OTHER PUBLICATIONS

Roman Vladimirovich Marchenko, et al., "Data Storage System Tiering Accounting for Limited Write Endurance," Russian Patent Application No. PCT/RU2016/000941, filed Dec. 28, 2016.

Peter Puhov, et al., "Virtual Drive Based Raid Groups," U.S. Appl. No. 15/393,859, filed Dec. 29, 2016.

Jian Gao, et al., "Providing RAID-10 With a Configurable RAID Width Using a Mapped Raid Group," U.S. Appl. No. 15/499,546, filed Apr. 27, 2017.

Hongpo Gao, et al., "Adjustable Error Sensitivity for Taking Disks Offline in a Mapped Raid Storage Array," U.S. Appl. No. 15/499,669, filed Apr. 27, 2017.

Jamin Kang, et al., "Distributing Mapped RAID Disk Extents When Proactively Copying From an EOL Disk," U.S. Appl. No. 15/581,935, filed Apr. 28, 2017.

Jian Gao, et al., "Splitting a Group of Physical Data Storage Devices Into Partnership Groups to Limit the Risk of Data Loss During Drive Rebuilds in a Mapped RAID (Redundant Array of Independent Disks) Data Storage System," U.S. Appl. No. 15/497,984, filed Apr. 26, 2017.

Jian Gao, et al., "Reducing Concurrency Bottlenecks While Rebuilding a Failed Drive in a Data Storage System," U.S. Appl. No. 15/498,609, filed Apr. 27, 2017.

Jian Gao, et al., "Disk Activity Balancing in Mapped RAID Storage Arrays by Data Remapping," U.S. Appl. No. 15/581,944, filed Apr. 28, 2017.

* cited by examiner

DISK EXTENT REBALANCING IN MAPPED RAID STORAGE ARRAYS

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify storage objects (e.g. logical disks or "LUNs") that are to be written, read, created, or deleted. The storage processors run software that manages incoming I/O operations and that performs various data processing tasks to organize and secure the host data received from the host machines and stored on the non-volatile data storage devices Many conventional data storage appliances use RAID (redundant array of independent disks) technology to store large volumes of data across numerous physical storage drives without requiring user machines to address each individual disk. RAID systems also frequently store data redundantly so data can be recovered if one or more storage drives fail unexpectedly.

Some data storage appliances using RAID technology include spare storage drives which are reserved as "hot spares" in case one or more storage drives fail. In the event of a drive failure, the system can be "rebuilt" by reconstructing data from the failed drive using data from the remaining drives and then writing the recovered data to a spare drive. Once all the recovered data has been written to the spare drive, the system can continue normal operation.

SUMMARY

Unfortunately, conventional data storage appliances using RAID may experience performance limitations. Upon failure of a drive, performing a rebuild of the system requires reading data from the remaining drives and copying the reconstructed data to a spare drive which may have limited write performance. The speed of rebuilding the system will be bottlenecked by the maximum write throughput for writing the reconstructed data to the spare drive. The system is vulnerable to permanent data loss if an additional drive fails before the rebuild process is completed.

The speed of the rebuild process can be improved by using mapped RAID techniques. In mapped RAID, the system distributes data across RAID extents which are made up of disk extents. The disk extents of each RAID extent are provided by different physical storage drives. Instead of reserving one or more entire physical drives as spares, mapped RAID allocates spare disk extents distributed across a large pool of drives in the data storage appliance. The performance bottleneck associated with rebuilding is reduced when writing the rebuilt data is distributed across multiple drives.

However, over time, adding new storage drives or creating new RAID extents in mapped RAID systems may lead to the distribution of RAID extents over the storage drives becoming less uniform. Unfortunately, if RAID extents become non-uniformly distributed over the drives of a mapped RAID system, rebuild performance may be worse than desired.

In contrast with prior approaches, improved techniques detect non-uniform distributions of RAID extents across the storage drives of a data storage appliance and rebalance the allocation of disk extents of the storage drives amongst the RAID extents. Advantageously, the improved techniques prevent the distribution of RAID extents across the storage drives of a mapped RAID system from becoming overly non-uniform, which would impair rebuild performance.

Certain embodiments are directed to a method of improving performance in a data storage appliance using mapped RAID. The method includes providing, by processing circuitry, a set of RAID extents for storing data in the data storage appliance, each RAID extent containing a respective set of disk extents allocated to that RAID extent, each disk extent supported by an extent of storage on a physical storage drive of a set of physical storage drives housed within the data storage appliance. The method also includes calculating, by the processing circuitry, for an initial arrangement of disk extents allocated to RAID extents of the set of RAID extents, an initial set of data adjacency scores. Each data adjacency score indicates, for a corresponding pair of physical storage drives from the set of physical storage drives, the pair having a first drive and a second drive, a number of RAID extents which contain disk extents belonging to both the first drive of the pair and the second drive of the pair. The method also includes, in response to attempting to change a configuration of disk extents in the data storage appliance, performing, by the processing circuitry, an extent balancing operation.

The extent balancing operation includes providing an alternate arrangement of disk extents allocated to each of the RAID extents, the alternate arrangement differing from the initial arrangement. The extent balancing operation also includes outputting a comparison result indicating that a variance of a new set of data adjacency scores corresponding to the alternate arrangement of disk extents is less than a variance of the initial set of data adjacency scores by more than a predetermined threshold. The extent balancing operation further includes, in response to outputting the comparison result, replacing, in a particular RAID extent, a first disk extent belonging to that RAID extent in the initial arrangement with a second disk extent belonging to that RAID extent in the alternate arrangement.

Other embodiments are directed to a computer program product, an apparatus, and a system configured to perform similar methods.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

Improved techniques detect non-uniform distributions of RAID extents across the storage drives of a data storage appliance and rebalance the allocation of disk extents of the storage drives amongst the RAID extents. The improved techniques realize the rebuild performance advantages of mapped RAID technology while ensuring these advantages are not compromised by uneven distribution of RAID extents across the storage drives of the data storage appliance.

Figure 1:
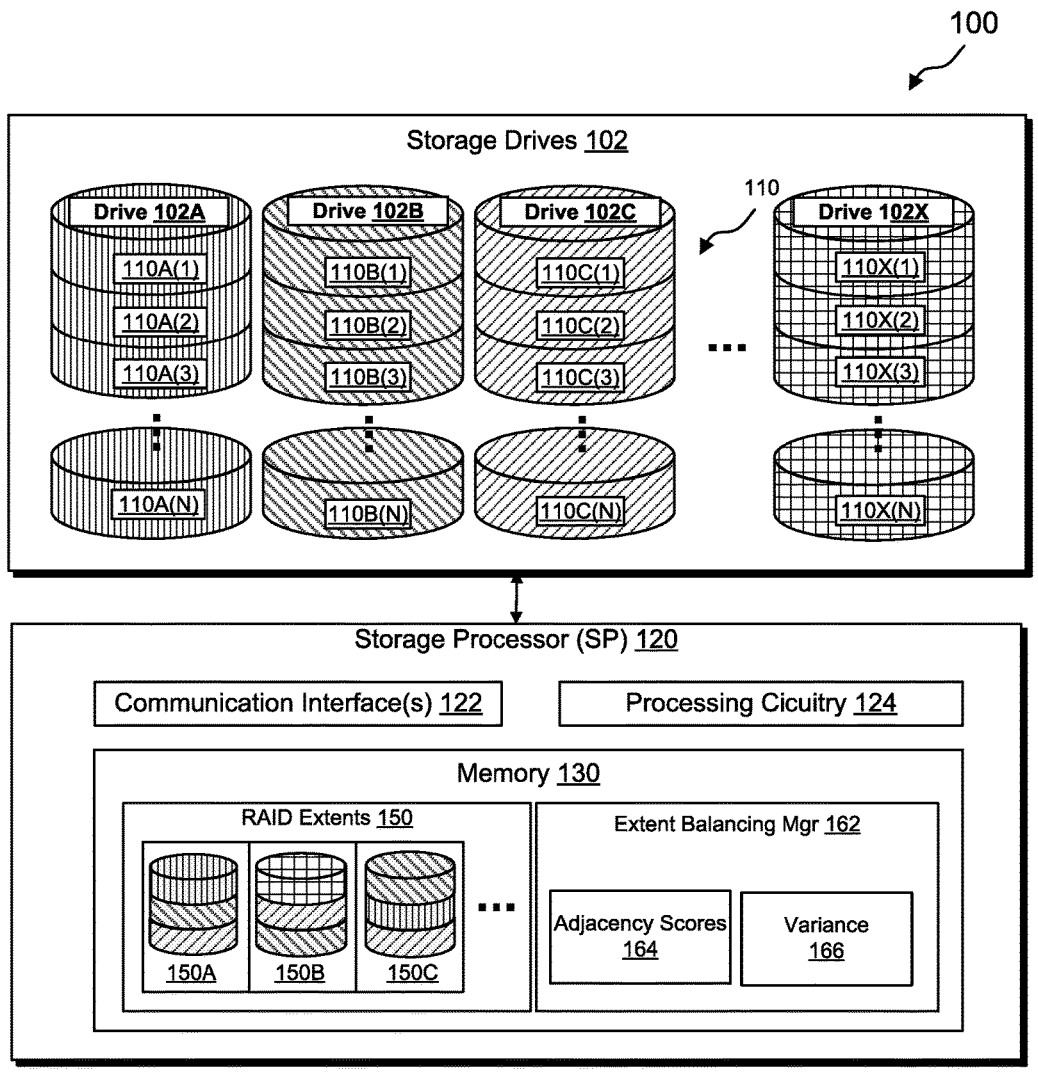
FIG. 1 is a block diagram of an example data storage appliance for use in connection with various embodiments.

FIG. 1 shows an example data storage appliance 100 in which embodiments of the improved technique hereof can be practiced. The data storage appliance 100 includes a set of physical storage drives 102 (depicted as storage drives 102A, 102B, 102C, . . . , 102X) which supply a set of disk extents 110. The storage drives 102 may include any combination of magnetic disk drives, flash storage drives, and other storage devices.

Each of the storage drives 102 contains a set of disk extents 110 belonging to that drive. For instance, storage drive 102A is shown with N disk extents 110A(1)-110A(N) and storage drive 102B is shown with N disk extents 110B(1)-110B(N). Similarly, drive 102C is shown with a set of disk extents 110C(1)-110(N) and drive 102X with a set of disk extents 110X(1)-110X(N). Each disk extent 110 is depicted with a shading pattern which identifies the storage drive 102 it belongs to. A typical disk extent 110 may have a capacity of 4 gigabytes, for example.

In addition it should be understood that the set of physical storage drives 102 may be treated either as single pool of storage drives 102 or as many pools, each pool containing a subset of the set of physical storage drives 102 and that the methods disclosed herein may be applied either to all the physical storage drives 102 or separately to one or more pools of the storage drives 102.

The data storage appliance 100 has a storage processor 120 coupled to the storage drives 102. The storage processor 120 includes a communication interface 122, processing circuitry 124, and memory 130. In some embodiments, there may be more than one storage processor 120.

The communications interface 122 may include one or more Ethernet cards, cellular modems, FC adapters, Wireless Fidelity (Wi-Fi) wireless networking adapters, and/or other devices for connecting to a network. Processing circuitry 124 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Processing circuitry 124 handles instructions, including requests to read and write data from other devices received via the communication interface 122. The processing circuitry 124 also organizes the storage capacity of the data storage appliance 100 into RAID extents 150. The processing circuitry 124 stores a mapping between RAID extents 150 and disk extents 110 in the memory 130. The processing circuitry 124 also includes a storage interface which allows access to the storage drives 102.

Memory 130 may be any kind of digital system memory, such as, for example, random access memory (RAM). Memory 130 stores one or more operating systems (OSes) in operation (e.g., Linux, UNIX, Windows, MacOS, or a similar operating system; not depicted) and various applications (not depicted) executing on processing circuitry 124.

Each RAID extent 150 has a subset of the disk extents 110 allocated to it. For purposes of illustration, each RAID extent 150 is shown containing three disk extents 110 allocated to it, with each disk extent 110 shown with a corresponding shading pattern indicating which storage drive 102 it belongs to. In some arrangements a number of RAID extents 150 may collectively form a RAID group. In such arrangements, a data storage appliance 100 may have any number of RAID groups.

It should be understood that the RAID extents 150 are shown containing three disk extents 110 for purposes of illustration. However, a RAID extent 150 need not contain exactly three disk extents 110 and, in various embodiments, may contain any number of disk extents 110. It should also be understood that a RAID extent 150 may be implemented as a data structure representing a set of relations between logical block addresses and disk extents 110. While FIG. 1 shows three RAID extents 150, this is by way of example only. It should be understood that a data storage appliance 100 may have any number of RAID extents 150.

In some embodiments, a RAID extent 150 must not contain more than one disk extent 110 from any one of the storage drives 102 (i.e., each disk extent 110 in a RAID extent 150 must be provided by a different storage drive 102 from each of the other disk extents 110 in that RAID extent 150). Further, in some arrangements, each RAID extent 150 must contain a specific number of disk extents 110.

For example, some embodiments may implement RAID 5 and require exactly five disk extents 110 in each RAID extent 150. Other embodiments may implement RAID 5 with exactly eight disk extents 110 in each RAID extent 150. Still other arrangements may implement other RAID configurations, such as RAID 6, or RAID 10, and require various other numbers of disk extents 110 in each RAID extent 150. Furthermore, some embodiments may implement various combinations of RAID configurations.

As further shown in FIG. 1, the memory 130 includes, i.e., implements with executable instructions, extent balancing manager 162, which calculates adjacency scores 164 and a variance 166 for a current arrangement of disk extents 110 allocated to RAID extents 150.

In some embodiments, memory 130 may also include a persistent storage portion (not depicted). The persistent storage portion of memory 130 may be made up of one or more persistent storage devices, such as, for example, disks. The persistent storage portion of memory 130 is configured to store programs and data even while the data storage system 100 is powered off. The OS and the applications are typically stored in this persistent storage portion of memory so that they may be loaded into a system portion of memory 130 from this persistent storage portion of memory 130 upon a system restart. The processing circuitry 124 running one or more of these programs (such as extent balancing manager 162) thus forms a specialized circuit constructed and arranged to carry out the various processes described herein.

Each of the set of adjacency scores 164 corresponds to a unique pair of storage drives (e.g., storage drive 102A and storage drive 102B) chosen from the set of storage drives 102. For a given pair of storage drives 102, the member of the set of adjacency scores 164 for that pair of drives 102 corresponds to how many of the RAID extents 150 contain disk extents 110 that belong to both of the pair of storage drives 102. In other words, each of the adjacency scores 164 indicates how many RAID extents 150 two storage drives 102 have in common with each other. If two storage drives 102 have an adjacency score 164 greater than zero, they are said to be 'adjacent' to each other. As a matter of convention, a drive 102 is not adjacent to itself.

The variance 166 for the set of adjacency scores 164 indicates how much the values of the adjacency scores 164 vary with respect to each other or to an average value of the adjacency scores 164. A variance 166 of zero, for instance, would indicate that all the adjacency scores 164 have the same value. In some arrangements, the variance 166 may take the form of a standard deviation or other recognized statistical measure of the adjacency scores 164.

Figure 2A:
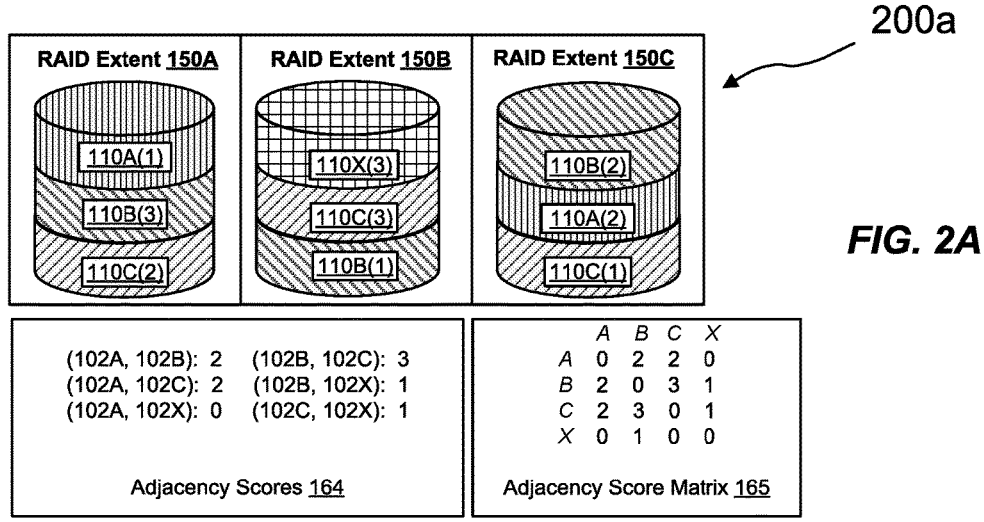
FIGS. 2A-2B show example arrangements of data structures for use in connection with various embodiments.

FIG. 2A shows an example arrangement 200a of disk extents 110 within RAID extents 150. In this example, the RAID extents 150A, 150B, and 150C are shown. For purposes of illustration only, each RAID extent 150 contains exactly three disk extents 110. Also shown in FIG. 2A are the adjacency scores 164 for arrangement 200a, as well as a matrix representation 165 of the same adjacency scores 164. The matrix representation 165 may be a more convenient representation and shows the adjacency scores 164 in a matrix with indices labeled according to the storage drives 102 present in the arrangement 200a. In this form, the diagonal elements are defined as zero (i.e., a storage drive is not adjacent to itself). It will be appreciated that the matrix element (A, B) has the same value as the matrix element (B, A) because the pair of drives (102A, 102B) is the same as the pair of drives (102B, 102A).

In arrangement 200a, RAID extent 150A contains disk extents 110A(1), 110B(3), and 110C(2), which are part of storage drives 102A, 102B, and 102C, respectively. RAID extent 150B contains disk extents 110X(3), 110C(3), and 110B(1), which are part of storage drives 102X, 102C, and 102B, respectively. RAID extent 150C contains disk extents 110B(2), 110A(2), and 110C(1), which are part of storage drives 102B, 102A, and 110C, respectively.

Because RAID extent 150B contains disk extents 110B(1) and 110X(3) from storage drives 102B and 102X, storage drives 102B and 102X are adjacent. Because there is only one such RAID extent 150 (i.e., RAID extent 150B) having disk extents 110 from drive 102B and drive 102X, the adjacency scores 164 include a score for the pair of drives (102B, 102X) equal to one. Because RAID extent 150A and RAID extent 150C both contain disk extents 110 from storage drives 102A and 102B, drives 102A and 102B are adjacent. Because there are two RAID extents 150 (RAID extents 150A and 150C) containing extents from these two drives, 102A and 102B, the adjacency scores 164 include a score for the pair of drives (102A, 102B) equal to two. Because there are no RAID extents 150 which have disks extents 110 from both drives 120A and 102X, the adjacency scores 164 have a score for the pair of drives (102A, 102X) equal to zero.

Figure 2B:
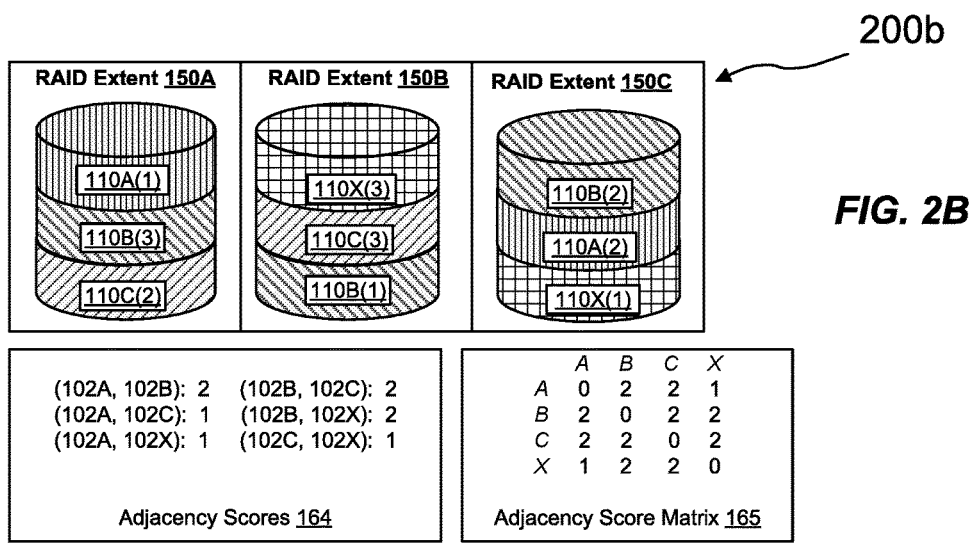

FIG. 2B shows another example arrangement 200b of disk extents 110 within the same RAID extents 150 (150A, 150B, and 150C) and provided by the same four storage drives, 102A, 102B, 102C, and 102X. Comparing the adjacency scores 164 for arrangement 200a with the adjacency scores for arrangement 200b, it can be seen that, in arrangement 200b, each of the four drives 102 is adjacent to at least one other drive 102.

Figure 3A:
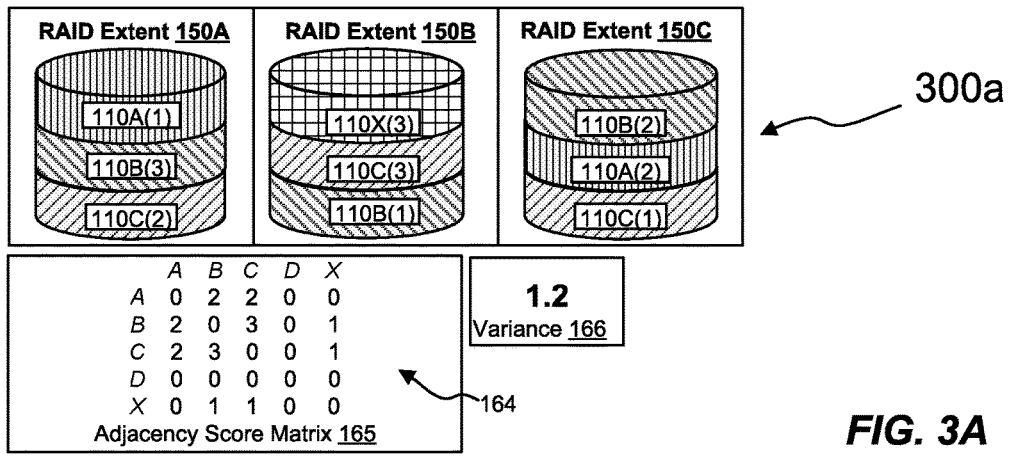
FIGS. 3A-3C show example arrangements of data structures for use in connection with various embodiments.

FIG. 3A shows an example arrangement 300a. The arrangement of disk extents 110 within the RAID extents 150 is identical to the arrangement of disk extents 110 in the RAID extents 150 of arrangement 200a of FIG. 2A. However, a fifth storage drive, 102D (not depicted) has been introduced, as reflected by the adjacency scores 164 (now shown only in matrix form 165) which now include scores corresponding to pairs of storage drives 102 which include storage drive 102D as one of the storage drives 102. Also shown is a variance 166 for arrangement 300a which indicates how uniformly the RAID extents 150 are distributed across the storage drives 102. In this example, the adjacency scores 164 range from zero to three and the variance 166 is equal to 1.2. In this example, the variance 166 is calculated as the statistical variance of the adjacency scores 164. Only scores for unique pairs of storage drives 102 are used (i.e., each pair of drives is only counted once, even though the matrix form 165 shows redundant pairs). However, other methods may be used instead. For instance, a sum of absolute differences between each adjacency score and an average value might be used.

In some embodiments, the storage processor 120 invokes the extent balancing manager 162 to make the distribution of RAID extents 150 more uniform, given an arrangement of disk extents 110 such as example arrangement 300a, shown in FIG. 3A. This can be achieved by redistributing RAID extents 150, as shown, for example, in example arrangement 300b of FIG. 3B. In arrangement 300b, disk extent 110B(2) from arrangement 300a has been replaced by disk extent 110D(1) within RAID extent 150C. This change between arrangements 300a and 300b results in new data adjacency scores 164 and a new variance 166, now equal to 0.54

Figure 3B:
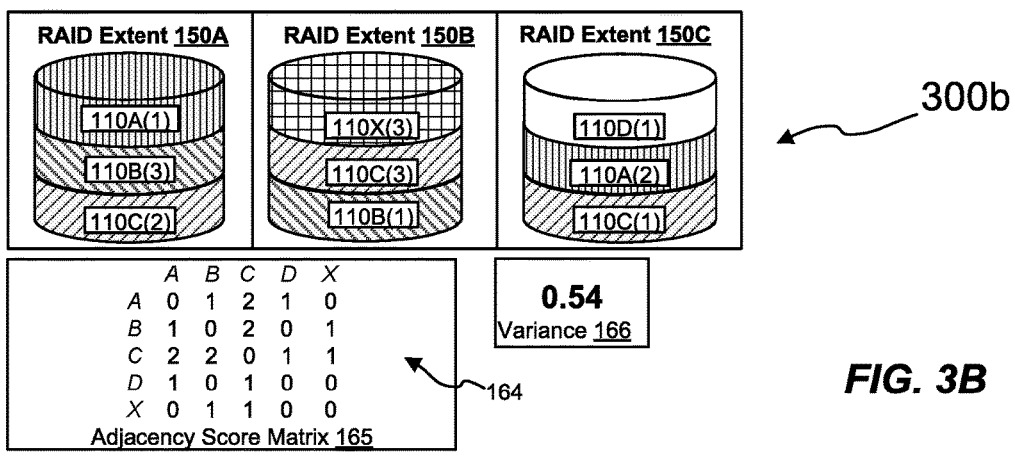
Figure 3C:
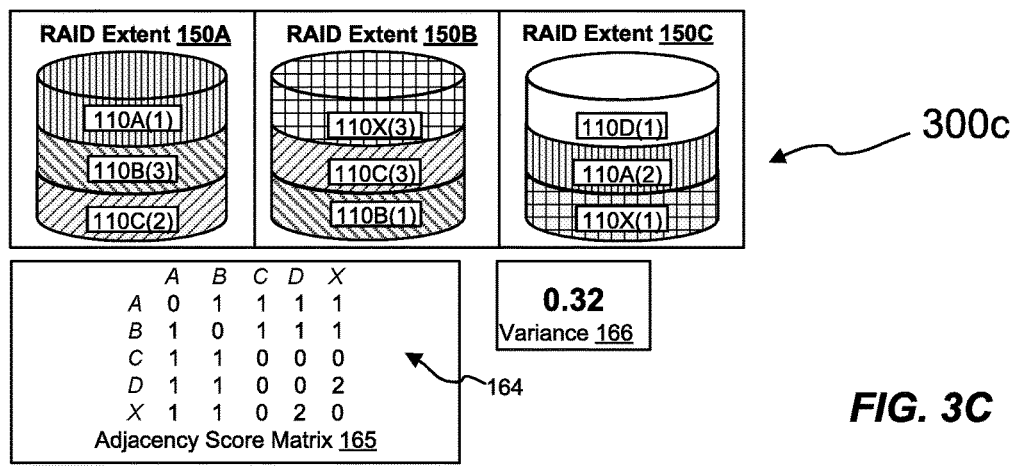

FIG. 3C shows example arrangement 300c. Arrangement 300c can be achieved by replacing a single disk extent 110 within a single RAID extent 150 of arrangement 300b, just as arrangement 300b can be produced by replacing a single disk extent 110 from arrangement 300a. In arrangement 300c, disk extent 110D(2) has replaced disk extent 110C(3) from arrangement 300b, yielding an even lower variance 166 (i.e., greater uniformity), now equal to 0.32.

As shown by FIG. 3A, the addition of new disk extents 110 to the data storage appliance 100 can make the distribution of RAID extents 150 less uniform, but also results in opportunities to make the distribution of RAID extents 150 across the storage drives 102 more uniform. In example arrangement 300a of FIG. 3A, the introduction of an additional storage drive 102D (not shown; represented by an additional row a column in the adjacency score matrix 165) to the data storage appliance 100 increases the variance 166 over the variance 166 corresponding to arrangement 200a of FIG. 2A which features the same RAID extents 150. Adding the new storage drive 102D to arrangement 200a of FIG. 2A results in a variance 166 for arrangement 300a equal to 1.2 (compared to a value of 1.1 for arrangement 200a having one fewer storage drive 102).

FIG. 3B shows an example arrangement 300b which can be achieved by replacing a single disk extent 110 (disk extent 110B(2) of RAID extent 150C) in arrangement 300a with disk extent 110D(1) belonging to the new storage drive 102D. In arrangement 300a, storage drives 102B and 102C have an adjacency score of three. By replacing an appropriate disk extent (110B(2) in this example) on RAID extent 150C, the adjacency scores 164 become more uniform (the variance 166 of arrangement 300b is 0.54, compared to 1.2 for arrangement 300a).

FIG. 3C shows arrangement 300c, which results from continuing to reduce the variance 166 by replacing an appropriate disk extent 110 in a RAID extent 150. In arrangement 300c, disk extent 110C(3) from arrangement 300b is replaced in RAID extent 150B with disk extent 110D(2). As a result, the variance 166 is further compared to arrangements 300a and 300b, to a value of 0.32.

It should be appreciated that not every possible exchange of disk extents 110 will result in reducing the variance 166. The extent balancing manager 162 calculates the adjacency scores 164 and resultant variance 166 for various alternate arrangements of disk extents 110 to find movements of disk extents 100 which effect a reduction of the variance 166 of the adjacency scores 164. In some embodiments, the extent balancing manager 162 first calculates arrangements of the disk extents 110 produced by replacing a disk extent 110 from a storage drive 102 belonging to a pair of storage drives 102 with a highest data adjacency score. A score with a highest value will necessarily have a value greater than or equal to the average of all the adjacency scores 164. By replacing a disk extent 110 from a corresponding storage drive 102 of that pair, the adjacency score 164 for that pair of storage drives 102 may be lowered and the individual scores for other pairs with lower scores may be raised, leading to a more uniform distribution of values within the set of adjacency scores 164. Highly uniform values of the adjacency scores 164 are indicative of a correspondingly uniform distribution of the RAID extents 150 across the storage drives 102.

The storage processor 120 may invoke the extent balancing manager 162 in other scenarios that indicate non-uniformity in the distribution of the RAID extents 150 across the storage drives 102. For example, the storage processor 120 may attempt to create a new RAID extent 150 but may fail to do so because it cannot create a valid RAID extent 150 given a set of available (unallocated) disk extents 110 remaining on the storage drives 102. An example of such a scenario is depicted by FIG. 4

Figure 4:
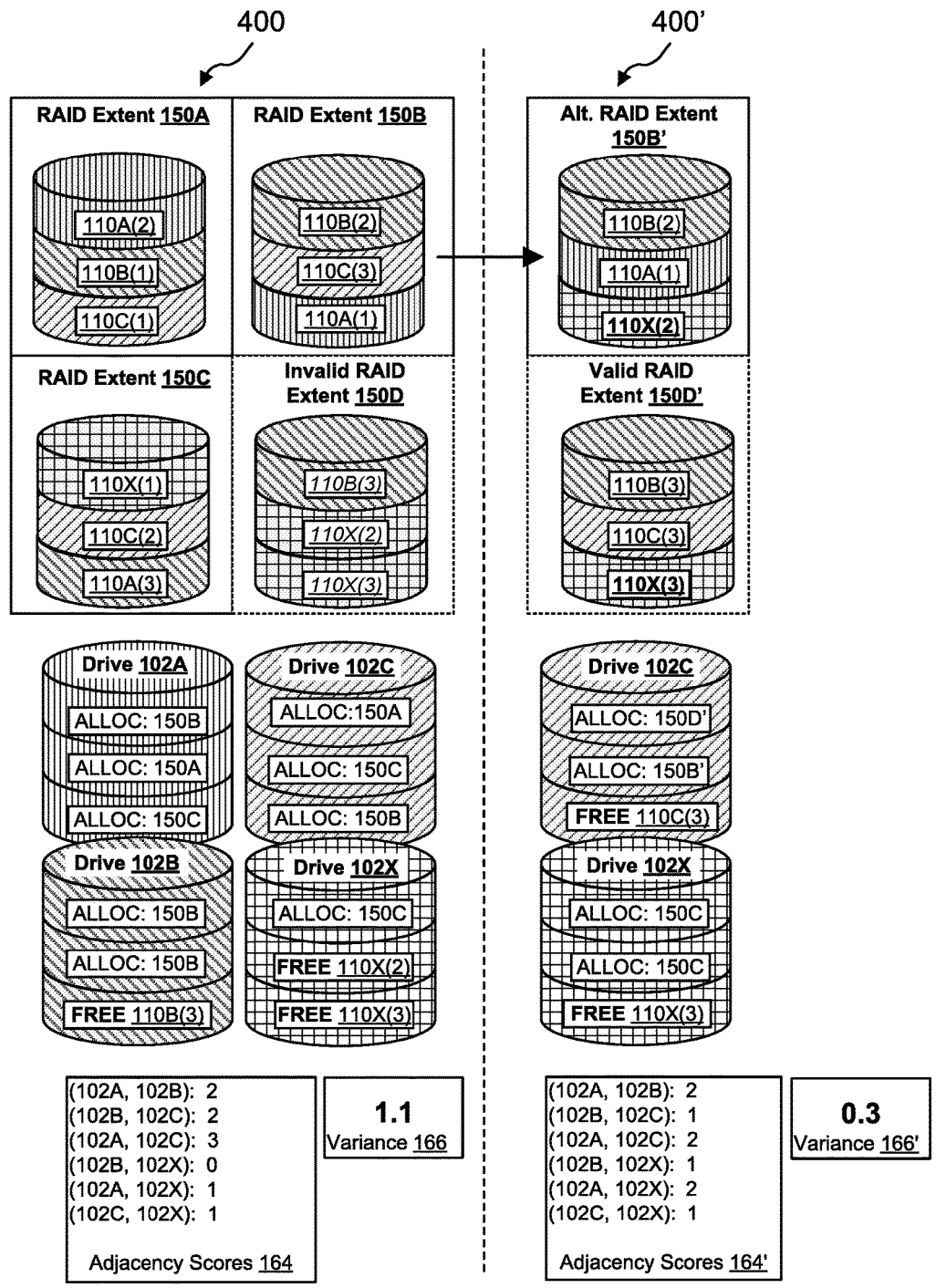
FIG. 4 shows example arrangements of data structures for use in connection with various embodiments.

FIG. 4 shows an initial example arrangement 400 of disk extents 110 contained by RAID extents 150A, 150B, and 150C. Also shown are the storage drives 102A, 102B, 102C, and 102X which supply the disk extents 110. Disk extents 110 which are allocated to one of the RAID extents 150 shown are marked as allocated with the label 'ALLOC:' followed by the RAID extent 150 to which each of those disk extents are allocated. Unallocated disk extents 110 are labeled 'FREE.' The data adjacency scores 164 and variance 166 corresponding to arrangement 400 are also shown. As shown, example arrangement 400 has four storage drives, 102A, 102B, 102C, and 102X, each having three disk extents 110. FIG. 4 also shows a modified arrangement 400' of certain disk extents 110 of arrangement 400 and the corresponding data adjacency scores 164' and variance 166' for arrangement 400'.

As above, certain embodiments place requirements on the disk extents 110 which may be contained within a RAID extent 150. For instance, some embodiments require that each disk extent 110 within a given RAID extent 150 must be supplied by a storage drive 102 which is different from every other storage drive 102 supplying the other disk extents 110 of that RAID extent 150.

If the storage processor 120 in such an embodiment attempts to create a new RAID extent 150, such as 150D, it must select three disk extents, each extent 110 supplied by a different drive 102. However, there are only three unallocated disk extents 110 in arrangement 400: 110B(3), belonging to storage drive 102B, and extents 110X(2) and 110X(3), both belonging to storage drive 102X. Because two of the three available extents (110X(2) and 110X(3)) originate from the same storage drive 102, RAID extent 150D would be an invalid RAID extent and the RAID extent creation operation will fail, even though sufficient storage capacity exists to create a new RAID extent 150. If the RAID extents 150 are unevenly distributed across the storage drives 102, such failures may become likely. Under such circumstances, the storage processor 120 may alleviate these problems by invoking the extent balancing manager 162 to rebalance the RAID extents 150 (such as RAID extents 150A, 150B, and 150C shown).

For example, the extent balancing manager 162 may select an extent 110 from the pair of storage drives 102 with the highest score of the data adjacency scores 164 (e.g., the pair of storage drives 102A and 102C has a score equal to three), such as extent 110C(3) in RAID Extent 150B and replace it with disk extent 110X(2). Doing so reduces the variance 166 of arrangement 400 (equal to 1.1) to the variance 166' (equal to 0.3) for the modified arrangement 400'. An effect of this example (partial) rebalancing operation is that the modified arrangement 400' now has three available disk extents 110, respectively supplied by distinct storage drives 102B, 102C, and 102X. Consequently, it becomes possible for the storage processor 120 to create a valid RAID extent 150D' in arrangement 400' with member disk extents 110 as shown in FIG. 4.

Figure 5:
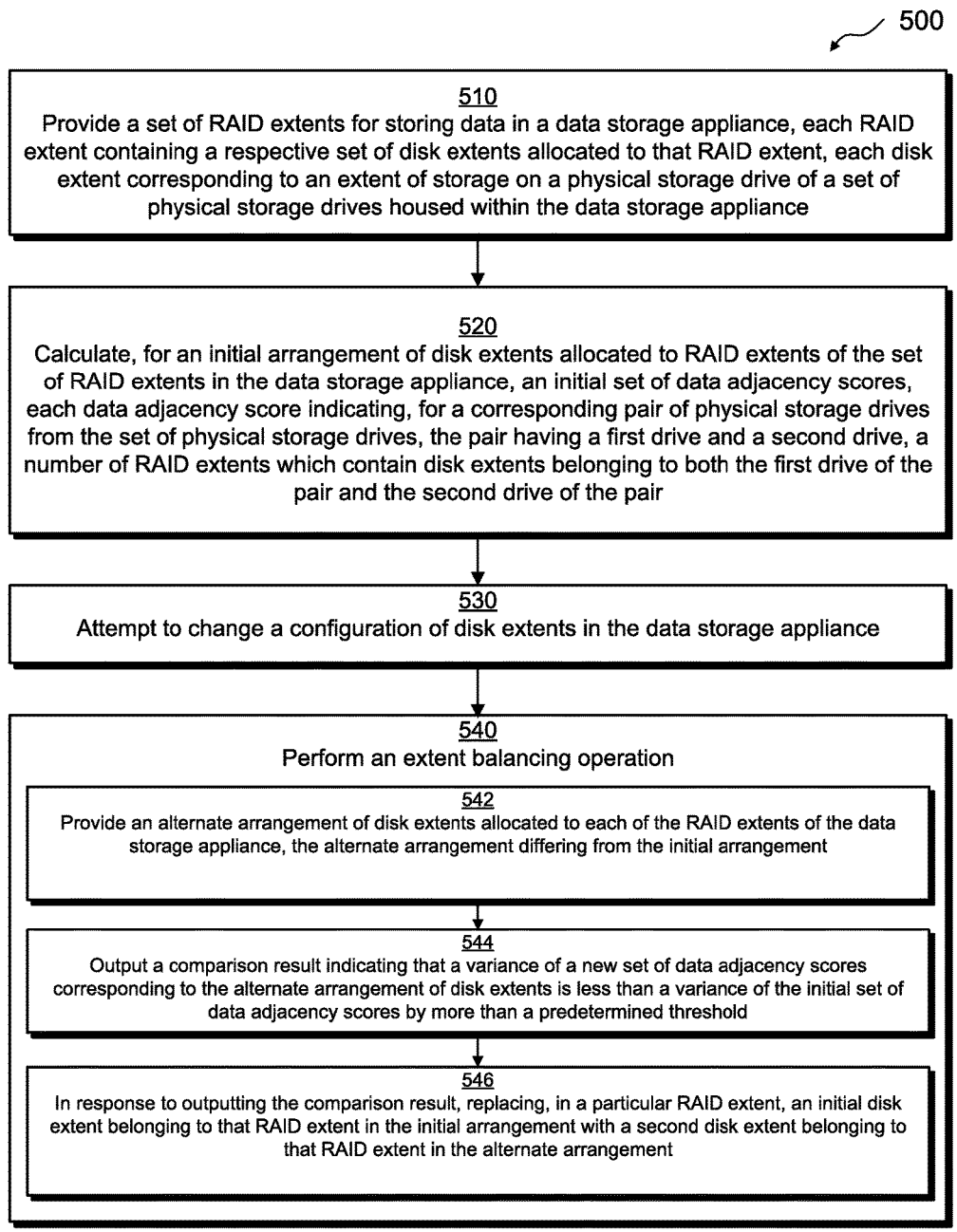
FIG. 5 is a flowchart depicting example methods of various embodiments.

FIG. 5 shows an example process 500 used in some embodiments to improve performance by rebalancing the distribution of RAID extents 150 across the disk extents 110 of storage drives 102. The process 500 includes steps 510, 520, 530, and 540. Step 540 includes sub-steps 542, 544, and 546. It should be understood that any time a piece of software (e.g., extent balancing manager 162) is described as performing a method, process, step, or function, in actuality what is meant is that a computing device (e.g., data storage system 100 or its component storage processor 120, etc.) on which that piece of software is running performs the method, process, step, or function when executing that piece of software on its processing circuitry 124. It should be understood that although depicted in one order, one or more steps or sub-steps may be combined together or performed in a different order. It should be understood that, in some embodiments, one or more of the steps may be omitted. Similarly, in some embodiments, one or more steps may be combined together or performed in a different order.

At step 510 the extent balancing manager 162 provides a set of RAID extents 150 for storing data. Each RAID extent 150 has a set of disk extents 110 allocated to it. Each of the disk extents 110 corresponds to an extent of storage on a physical storage drive 102 housed within a data storage appliance such as the data storage appliance 100.

At step 520, the process calculates a set of data adjacency scores such as the data adjacency scores 164 described previously. Each score of the data adjacency scores 164 corresponds to how many RAID extents 150 contain disk extents 110 which belong to both drives 102 of each possible unique pair of physical storage drives 102 in the data storage appliance 100.

At step 530, processing circuitry 124 responds to a command by attempting to change a configuration of disk extents 110 in the data storage appliance 100. For example, the processing circuitry 124 may attempt to add additional storage drives 102 to the data storage appliance 100. As another example, the processing circuitry 124 may attempt to create a new RAID extent 150 by allocating available disk extents 110 to the new RAID extent 150, but initially fail to do despite sufficient available storage capacity.

At step 540, the attempt to change the configuration of disk extents triggers the extent balancing manager 162 to perform an extent balancing operation. At sub-step 542, the extent balancing manager 162 produces an alternate arrangement of disk extents 110 in the appliance 100. At sub-step 544 the operation indicates that the alternate arrangement of disk extents has a lower variance (as discussed previously) than the original arrangement at the beginning of the operation. At sub-step 546, the extent balancing manager 162 effects the alternate arrangement by replacing a disk extent 110 within a RAID extent 150 with a disk extent 110 belonging to that RAID extent 150 in the alternate arrangement of disk extents 110.

Figure 6:
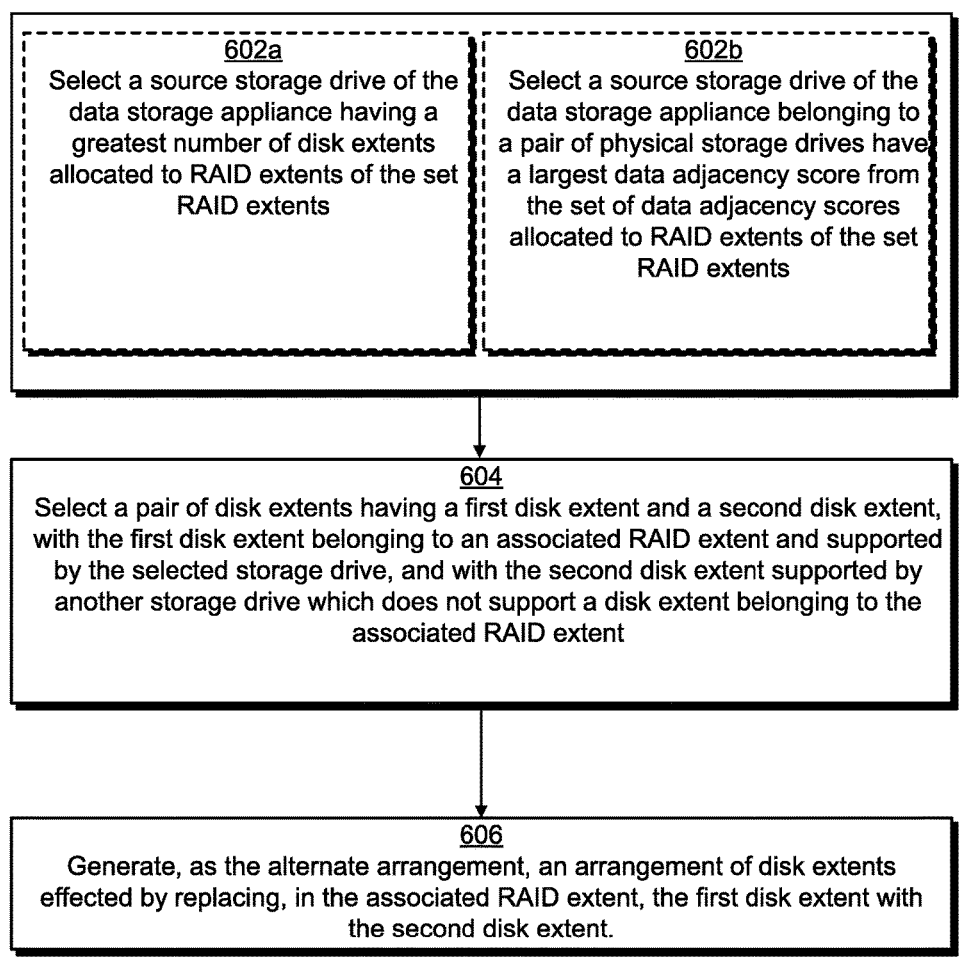
FIG. 6 is a flowchart depicting example methods of various embodiments.

FIG. 6 shows further details of sub-step 542 according to various embodiments. It should be understood that, within FIG. 6, sub-step 602*a* and 602*b* are drawn with a dashed border because they are alternatives, whose choice depends on the embodiment. In addition, one or more of the other steps or sub-steps of method 500 may also be omitted in some embodiments. Similarly, in some embodiments, one or more steps or sub-steps may be combined together or performed in a different order.

In some embodiments, sub-step 542 begins at sub-step 602*a*. In other embodiments, sub-step 542 begins at sub-step 602*b*. At both 602*a* or 602*b* the process selects a source storage drive 102 of the data storage appliance 100, such as one of the storage drives 102 depicted in FIG. 4. At 602*a* the selected source storage drive 102 is the storage drive 102 that supplies the greatest number of disk extents 110 to the RAID extents 150 (such as those shown in FIG. 3 and FIG. 4) of the system. By contrast, at 602*b* the selected source storage drive 102 belongs to a pair of storage drives 102 with a highest score of the data adjacency scores 164, as discussed previously.

For instance, with reference the example of FIG. 4, storage drive 102A and 102C each support three disk extents 110 in the RAID extents 150 shown in example arrangement 400. In this example, the pair of storage drives (102A, 102C) both supply a greatest number of disk extents 110 to the RAID extents 150 as well as having the highest value of the set of adjacency scores 164 (equal to three).

At sub-step 604, the extent balancing manager 162 selects a pair of disk extents 110 having a first disk extent 110 and a second disk extent 110, with the first disk extent 110 belonging to an associated RAID extent 150 and supported by the selected storage drive 102, and with the second disk extent 110 supported by another storage drive 102 which does not support a disk extent 110 belonging to the associated RAID extent 150.

For instance referring again to FIG. 4, the extent balancing manager 162 selects disk extent 110C(3) from storage drive 102A which belongs to RAID extent 150B in arrangement 400, as the first disk extent 110. In arrangement 400', disk extent 110C(3) is replaced by disk extent 110X(2) in RAID extent 150B.

At sub-step 606, the extent balancing manager 162 generates, as the alternate arrangement, an arrangement of disk extents effected by replacing, in the associated RAID extent, the first disk extent with the second disk extent.

Thus, techniques have been presented which detect non-uniform distributions of RAID extents 150 across the storage drives 102 of a data storage appliance 100 and rebalance the allocation of disk extents 110 of the storage drives 102 amongst the RAID extents 150. The improved techniques realize the rebuild performance advantages of mapped RAID technology while ensuring these advantages are not compromised by uneven distribution of RAID extents 150 across the storage drives 102 of the data storage appliance 100.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of improving performance in a data storage appliance using mapped RAID, the method comprising:

providing, by processing circuitry, a set of RAID extents for storing data in the data storage appliance, each RAID extent containing a respective set of disk extents allocated to that RAID extent, each disk extent supported by an extent of storage on a physical storage drive of a set of physical storage drives housed within the data storage appliance;

calculating, by the processing circuitry, for an initial arrangement of disk extents allocated to RAID extents of the set of RAID extents, an initial set of data adjacency scores, each data adjacency score indicating, for a corresponding pair of physical storage drives from the set of physical storage drives, the pair having a first drive and a second drive, a number of RAID extents which contain disk extents belonging to both the first drive of the pair and the second drive of the pair; and in response to attempting to change a configuration of disk extents in the data storage appliance, performing, by the processing circuitry, an extent balancing operation which includes:

providing an alternate arrangement of disk extents allocated to each of the RAID extents, the alternate arrangement differing from the initial arrangement;

outputting a comparison result indicating that a variance of a new set of data adjacency scores corresponding to the alternate arrangement of disk extents is less than a variance of the initial set of data adjacency scores by more than a predetermined threshold; and in response to outputting the comparison result, replacing, in a particular RAID extent, an initial disk extent belonging to that RAID extent in the initial arrangement with an alternate disk extent belonging to that RAID extent in the alternate arrangement.

2. A method as in claim 1 wherein providing the alternate arrangement of disk extents includes:

selecting a storage drive of the data storage appliance having a greatest number of disk extents allocated to RAID extents of the set RAID extents;

selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and generating, as the alternate arrangement, an arrangement of disk extents effected by replacing, in the associated RAID extent, the first disk extent with the second disk extent.

3. A method as in claim 2, wherein selecting the pair of disk extents includes:

generating a set of variance reduction values by calculating, for each possible pair of first and second disk extents, a respective reduction in the variance of the initial data adjacency scores which would result from replacing, in the associated RAID extent, the first disk extent with the second disk extent;

selecting a largest variance reduction value from the set of variance reduction values; and providing, as the pair of selected disk extents, a pair of first and second disk extents whose respective reduction value equals the selected largest variance reduction value.

4. A method as in claim 1 wherein providing the alternate arrangement of disk extents includes:

selecting a storage drive of the data storage appliance belonging to a pair of physical storage drives having a largest data adjacency score from the set of data adjacency scores allocated to RAID extents of the set RAID extents;

selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and generating, as the alternate arrangement, an arrangement of disk extents effected by replacing, in the associated RAID extent, the first disk extent with the second disk extent.

5. A method as in claim 4, wherein selecting the pair of disk extents includes:

generating a set of variance reduction values by calculating, for each possible pair of first and second disk extents, a respective reduction in the variance of the initial data adjacency scores which would result from replacing, in the associated RAID extent, the first disk extent with the second disk extent;

selecting a largest variance reduction value from the set of variance reduction values; and providing, as the pair of selected disk extents, a pair of first and second disk extents whose respective variation reduction equals the selected largest variance reduction value.

6. A method as in claim 1, wherein attempting to change the configuration of disk extents in the data storage system includes adding a set of additional physical storage drives to the set of physical storage drives of the data storage appliance.

7. A method as in claim 6, wherein each disk extent allocated to a particular RAID extent of the set of RAID extents belongs to a different physical storage drive from each other disk extent allocated to the same RAID extent;

wherein each RAID extent of the set of RAID extents contains a predetermined number of disk extents equal to a number of disk extents contained by each other RAID extent; and wherein adding the set of additional physical storage drives to the set of physical storage drives includes adding a number of physical storage drives fewer than the predetermined number.

8. A method as in claim 1, wherein each disk extent allocated to a particular RAID extent of the set of RAID extents belongs to a different physical storage drive from each other disk extent allocated to the same RAID extent;

wherein each RAID extent of the set of RAID extents contains a particular predetermined number of disk extents; and wherein attempting to change the configuration of disk extents in the data storage system includes, in response to a command to add a new RAID extent to the set of RAID extents, initially failing to create the new RAID extent due to a number of available disk extents of the data storage application from a mutually distinct set of physical storage drives of the data storage appliance being less than the predetermined number of disk extents.

9. An apparatus comprising:
a set of physical storage drives;

memory, storing a set of instructions; and
processing circuitry coupled to the memory and the set of physical storage drives, the processing circuitry constructed and arranged to execute the instructions stored by the memory, causing the processing circuitry to:
provide a set of RAID extents for storing data in the data storage appliance, each RAID extent containing a respective set of disk extents allocated to that RAID extent, each disk extent supported by an extent of storage on a physical storage drive of a set of physical storage drives housed within the data storage appliance;
calculate, for an initial arrangement of disk extents allocated to RAID extents of the set of RAID extents, an initial set of data adjacency scores, each data adjacency score indicating, for a corresponding pair of physical storage drives from the set of physical storage drives, the pair having a first drive and a second drive, a number of RAID extents which contain disk extents belonging to both the first drive of the pair and the second drive of the pair; and
in response to attempting to change a configuration of disk extents in the data storage appliance, perform an extent balancing operation which includes:
providing an alternate arrangement of disk extents allocated to each of the RAID extents, the alternate arrangement differing from the initial arrangement;
outputting a comparison result indicating that a variance of a new set of data adjacency scores corresponding to the alternate arrangement of disk extents is less than a variance of the initial set of data adjacency scores by more than a predetermined threshold; and
in response to outputting the comparison result, replacing, in a particular RAID extent, an initial disk extent belonging to that RAID extent in the initial arrangement with an alternate disk extent belonging to that RAID extent in the alternate arrangement.

10. An apparatus as in claim 9 wherein providing the alternate arrangement of disk extents includes:
selecting a storage drive of the data storage appliance having a greatest number of disk extents allocated to RAID extents of the set RAID extents;
selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and
generating, as the alternate arrangement, an arrangement of disk extents effected by replacing, in the associated RAID extent, the first disk extent with the second disk extent.

11. An apparatus as in claim 9 wherein providing the alternate arrangement of disk extents includes:
selecting a storage drive of the data storage appliance belonging to a pair of physical storage drives having a largest data adjacency score from the set of data adjacency scores allocated to RAID extents of the set RAID extents;
selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and
generating, as the alternate arrangement, an arrangement of disk extents effected by replacing, in the associated RAID extent, the first disk extent with the second disk extent.

12. An apparatus in claim 9, wherein attempting to change the configuration of disk extents in the data storage system includes adding a set of additional physical storage drives to the set of physical storage drives of the data storage appliance.

13. An apparatus in claim 9,
wherein each disk extent allocated to a particular RAID extent of the set of RAID extents belongs to a different physical storage drive from each other disk extent allocated to the same RAID extent;
wherein each RAID extent of the set of RAID extents contains a particular predetermined number of disk extents; and
wherein attempting to change the configuration of disk extents in the data storage system includes, in response to a command to add a new RAID extent to the set of RAID extents, initially failing to create the new RAID extent due to a number of available disk extents of the data storage application from a mutually distinct set of physical storage drives of the data storage appliance being less than the predetermined number of disk extents.

14. A computer program product comprising a non-transitory, computer-readable storage medium having instructions which, when executed by processing circuitry of a computing device, cause the processing circuitry to improve performance in a data storage appliance using mapped RAID by:
providing a set of RAID extents for storing data in the data storage appliance, each RAID extent containing a respective set of disk extents allocated to that RAID extent, each disk extent supported by an extent of storage on a physical storage drive of a set of physical storage drives housed within the data storage appliance;
calculating, for an initial arrangement of disk extents allocated to RAID extents of the set of RAID extents, an initial set of data adjacency scores, each data adjacency score indicating, for a corresponding pair of physical storage drives from the set of physical storage drives, the pair having a first drive and a second drive, a number of RAID extents which contain disk extents belonging to both the first drive of the pair and the second drive of the pair; and
in response to attempting to change a configuration of disk extents in the data storage appliance, performing an extent balancing operation which includes:
providing an alternate arrangement of disk extents allocated to each of the RAID extents, the alternate arrangement differing from the initial arrangement;
outputting a comparison result indicating that a variance of a new set of data adjacency scores corresponding to the alternate arrangement of disk extents is less than a variance of the initial set of data adjacency scores by more than a predetermined threshold; and
in response to outputting the comparison result, replacing, in a particular RAID extent, an initial disk extent belonging to that RAID extent in the initial arrangement with an alternate disk extent belonging to that RAID extent in the alternate arrangement.

15. A computer program product, as in claim 14 wherein providing the alternate arrangement of disk extents includes:
- selecting a storage drive of the data storage appliance having a greatest number of disk extents allocated to RAID extents of the set RAID extents;
- selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and
- generating, as the alternate arrangement, an arrangement of disk extents effected by replacing, in the associated RAID extent, the first disk extent with the second disk extent.

16. A computer program product as in claim 14 wherein providing the alternate arrangement of disk extents includes:
- selecting a storage drive of the data storage appliance belonging to a pair of physical storage drives having a largest data adjacency score from the set of data adjacency scores allocated to RAID extents of the set RAID extents;
- selecting a pair of disk extents having a first disk extent and a second disk extent, with the first disk extent belonging to an associated RAID extent and supported by the selected storage drive, and with the second disk extent supported by another storage drive which does not support a disk extent belonging to the associated RAID extent; and
- generating, as the alternate arrangement, an arrangement of disk extents effected by replacing, in the associated RAID extent, the first disk extent with the second disk extent.

17. A computer program product as in claim 14, wherein attempting to change the configuration of disk extents in the data storage system includes adding a set of additional physical storage drives to the set of physical storage drives of the data storage appliance.

18. A computer program product as in claim 14,
- wherein each disk extent allocated to a particular RAID extent of the set of RAID extents belongs to a different physical storage drive from each other disk extent allocated to the same RAID extent;
- wherein each RAID extent of the set of RAID extents contains a particular predetermined number of disk extents; and
- wherein attempting to change the configuration of disk extents in the data storage system includes, in response to a command to add a new RAID extent to the set of RAID extents, initially failing to create the new RAID extent due to a number of available disk extents of the data storage application from a mutually distinct set of physical storage drives of the data storage appliance being less than the predetermined number of disk extents.

\* \* \* \* \*